United States Patent

Mieville et al.

[11] Patent Number: 5,609,832
[45] Date of Patent: *Mar. 11, 1997

[54] EMISSIONS CONTROL SYSTEM AND METHOD

[75] Inventors: Rodney L. Mieville, Glen Ellyn; Ronald A. Dictor, Naperville; Eugene H. Hirschberg, Park Forest; Lawrence C. Robinson, Joliet; Don M. Washecheck; Terrence A. Renner, both of Naperville, all of Ill.

[73] Assignee: Amoco Corporation, Chicago, Ill.

[*] Notice: The term of this patent shall not extend beyond the expiration date of Pat. No. 5,303,547.

[21] Appl. No.: 523,634

[22] Filed: Sep. 5, 1995

Related U.S. Application Data

[63] Continuation of Ser. No. 205,320, Mar. 3, 1994, abandoned, which is a continuation of Ser. No. 869,028, Apr. 15, 1992, Pat. No. 5,303,547.

[51] Int. Cl.⁶ .................................................. F01N 3/10
[52] U.S. Cl. ..................... 422/173; 422/169; 422/171; 422/177; 422/180; 422/198; 422/211; 422/222; 423/212; 423/213.2; 423/213.5; 423/213.7; 60/274; 60/297; 60/311
[58] Field of Search ................................ 422/169, 171, 422/173, 175, 177, 180, 181; 60/274, 297, 311, 284, 298; 423/213.7, 213.2, 212, 213.5; 502/67, 77, 400

[56] References Cited

U.S. PATENT DOCUMENTS

| | | | |
|---|---|---|---|
| 2,942,932 | 6/1960 | Elliott | 423/212 |
| 2,970,886 | 2/1961 | Keeve | 423/213.2 |
| 3,067,002 | 12/1962 | Reid, Jr. | 423/212 |
| 3,645,098 | 2/1972 | Templin et al. | 60/288 |
| 3,674,441 | 7/1972 | Cole | 422/109 |
| 3,686,121 | 8/1972 | Kimberlin | 502/67 |
| 3,699,683 | 10/1972 | Tourtellotte et al. | 60/274 |
| 3,757,521 | 9/1973 | Tourtellotte et al. | 60/274 |
| 3,790,654 | 2/1974 | Bagley | 264/177 |
| 3,860,535 | 1/1975 | Johnson | 422/170 |
| 3,885,977 | 5/1975 | Lachman et al. | 106/62 |
| 3,892,537 | 7/1975 | Gulati et al. | 422/179 |
| 3,910,042 | 10/1975 | Yuge et al. | 60/286 |
| 4,017,347 | 4/1977 | Cleveland | 156/89 |
| 4,061,724 | 12/1977 | Grose et al. | 423/335 |
| 4,393,652 | 7/1983 | Munro | 60/295 |
| 4,476,196 | 10/1984 | Poeppel et al. | 429/32 |
| 4,532,228 | 7/1985 | Golino et al. | 502/261 |
| 4,541,240 | 9/1985 | Munro | 60/295 |
| 4,610,700 | 9/1986 | Miller | 502/67 |
| 4,631,268 | 12/1986 | Lachman et al. | 502/439 |
| 4,631,269 | 12/1986 | Lachman et al. | 502/439 |
| 4,637,995 | 1/1987 | DeAngelis et al. | 502/439 |
| 4,657,880 | 4/1987 | Lachman et al. | 502/64 |
| 4,877,766 | 10/1989 | Frost | 502/439 |
| 4,888,317 | 12/1989 | DeAngelis et al. | 502/60 |
| 4,934,142 | 6/1990 | Hayashi et al. | 60/297 |
| 4,985,210 | 1/1991 | Minami | 422/169 |

(List continued on next page.)

FOREIGN PATENT DOCUMENTS

| | | | |
|---|---|---|---|
| 1205980 | 6/1986 | Canada | 60/297 |
| 485179 | 5/1992 | European Pat. Off. . | |
| 257710 | 10/1989 | Japan | 60/297 |
| 0424966 | 5/1991 | United Kingdom | F01N 3/20 |
| 9411623 | 5/1994 | WIPO . | |

Primary Examiner—Robert J. Warden
Assistant Examiner—Hien Tran
Attorney, Agent, or Firm—Robert A. Yesukevich; Richard A. Kretchmer

[57] ABSTRACT

An exhaust gas emissions control system lowers cold-start hydrocarbon emissions by using heat exchange structure to lower the temperature of exhaust gas prior to the exhaust gas passing through a hydrocarbon adsorbent and using the extracted heat to heat a catalytic converter to its light-off temperature. In some embodiments, multi-component hydrocarbon adsorbers effective under different operating conditions further reduce cold-start hydrocarbon emissions.

13 Claims, 4 Drawing Sheets

U.S. PATENT DOCUMENTS

| | | | |
|---|---|---|---|
| 5,039,644 | 8/1991 | Lachman et al. | 502/208 |
| 5,078,979 | 1/1992 | Dunne | 423/212 |
| 5,125,231 | 6/1992 | Patil | 60/297 |
| 5,142,864 | 9/1992 | Dunne | 60/274 |
| 5,158,753 | 10/1992 | Take | 55/DIG. 30 |
| 5,284,638 | 2/1994 | Hertl et al. | 423/245 |
| 5,303,547 | 4/1994 | Mieville et al. | 422/173 |

EMISSIONS CONTROL SYSTEM AND METHOD

This application is a continuation of pending U.S. patent application Ser. No. 08/205,320, filed Mar. 3, 1994, now abandoned which is a continuation of U.S. patent application Ser. No. 07/869,028, filed Apr. 15, 1992, now U.S. Pat. No. 5,303,547.

FIELD OF THE INVENTION

This invention relates to a vehicular emissions control system which incorporates a catalytic converter and an adsorber to control hydrocarbon emissions. More particularly, the invention relates to control system designs incorporating a heat exchanger to improve the combined performance of a hydrocarbon adsorber and a catalytic converter.

BACKGROUND OF THE INVENTION

Modern vehicular emissions control systems typically employ a catalytic converter to reduce hydrocarbon emissions. The catalytic converter contains a catalyst which converts unburned exhaust hydrocarbons to less environmentally detrimental exhaust gases.

Unfortunately, modern catalytic converters only operate after reaching temperatures in excess of about 300 degrees Centigrade. For this reason, a substantial portion of hydrocarbon emissions occur during the first few minutes of cold-start engine operation before the converter reaches its minimum effective operating temperature, otherwise known as the converter "light-off" temperature. Because the first few minutes of operation is an integral part of automotive emissions tests, and because over 60% of the measured hydrocarbons are emitted during the cold-start period of the test, reducing cold-start hydrocarbon emissions is of critical importance. Recent tightening of emissions requirements to limit emissions of certain hydrocarbon compounds such as benzene has further underscored the need for reduced cold-start hydrocarbon emissions.

To reduce cold-start hydrocarbon emissions, emissions control designers have proposed routing exhaust gases through hydrocarbon adsorbers such as charcoal for a short period of time following an engine cold-start. For example, Templin, U.S. Pat. No. 3,645,098 teaches the use of an exhaust gas valve downstream of a catalytic converter for directing unconverted cold-start hydrocarbons onto a charcoal adsorber. As adsorber temperature increases, hydrocarbons initially adsorbed during the cold-start period are released from the adsorber and recirculated into the engine or exhaust manifold. Once the catalytic converter reaches its light-off temperature, the exhaust gas valve routes exhaust gas directly from the catalytic converter to the tailpipe.

While Templin's system might reduce hydrocarbon emissions below the levels emitted from similar systems lacking an adsorber, his system is not preferred because the system requires an exhaust gas valve to operate reliably under the severe chemical and temperature conditions present in the exhaust gas stream and because the physical adsorbance efficiency of his absorber is likely to decrease significantly with increasing exhaust gas temperature.

To overcome the disadvantages of systems like Templin's, other designers have turned to multi-adsorber systems. In these systems, exhaust gas flow is directed first to a low temperature adsorber chamber. As system temperature increases, flow is directed around the low temperature adsorber chamber to a second adsorber chamber containing an adsorber useful in a temperature range above that of the low temperature adsorber and below the catalytic converter light-off temperature. One example of such a system is disclosed in Minami, U.S. Pat. No. 4,985,210.

Minami discloses a system in which cold-start exhaust gas initially flows serially through a charcoal adsorber chamber, a Y-zeolite or mordenite adsorber chamber and a catalytic converter. When exhaust gas temperature reaches a predetermined level, an exhaust gas valve operates to route exhaust gas around the charcoal adsorber and directly into the second adsorption chamber containing the mordenite or zeolite. Because the second adsorber is believed to provide some additional hydrocarbon hold-up at temperatures exceeding the upper useful temperature of the charcoal adsorber, emissions may be reduced from the levels emitted from systems like Templin's. Unfortunately, like Templin's, Minami's system also employs an exhaust gas valve which must function reliably under the harsh physical and chemical conditions found in exhaust gas streams. Additionally, because exhaust gas passes directly into Minami's adsorbers, heat is lost in the adsorbers, thereby delaying catalytic converter light-off.

To avoid the reliability problems inherent in valved emissions systems, other designers have turned to non-valved designs combining an adsorber and a catalytic converter in a single unit. One such example is disclosed in U.S. Pat. No. 3,067,002 to Reid. Reid discloses an exhaust gas emissions control system in which a plurality of catalyst-containing channels are interspersed with a plurality of manifolded open ducts within a housing. As exhaust gas passes through the open ducts, the gas indirectly heats the catalyst contained in the catalyst beds prior to the exhaust gas entering the beds. Reid states that an adsorbent such as a natural or synthetic zeolite can be incorporated into a portion of each catalyst bed.

While Reid's design might reduce the time before catalytic converter light-off, the design appears to preclude the use of heat-damageable adsorbers such as charcoal because exhaust gas must continually pass through the adsorber at all times while the engine is running. More significantly, Reid's physical arrangement of interspersed heat transfer ducts, adsorbent and catalyst within a single envelope appears to limit the potential temperature difference between adsorber and catalyst, thereby limiting the potential effectiveness of his system.

What is needed is a mechanically simple, valveless exhaust gas emissions control system that employs one or more adsorbents to reduce hydrocarbon emissions over at least a substantial portion of the time period between an engine cold-start and catalytic converter light-off.

SUMMARY OF THE INVENTION

It is an object of the invention to provide an improved emissions control system for reducing cold-start hydrocarbon emissions.

It is another object of the invention to provide a valveless exhaust gas emissions control system offering improved cold-start emissions control.

It is yet another object of the invention to provide an emissions control system in which heat is removed from the exhaust gas and transferred to a catalytic converter prior to the exhaust gas passing through a hydrocarbon adsorber.

It is still another object of the invention to provide an improved hydrocarbon adsorbent for use in exhaust gas emissions control systems.

Other objects of the invention will become apparent as disclosed herein.

The foregoing objects can be accomplished by providing an emissions control system for treating engine exhaust gas comprising adsorber means for trapping hydrocarbons present in the exhaust gas following a cold engine start, catalytic converter means operatively connected to the adsorber means downstream of the adsorber means for catalytically reacting hydrocarbons present in the exhaust gas and heat exchange means operatively connected to the adsorber means upstream of the adsorber means for transferring exhaust gas heat from the exhaust gas to the catalytic converter means, thereby warming the catalytic converter and lowering the exhaust gas temperature prior to the exhaust gas entering the adsorber means.

The invention employs heat exchange techniques to improve the combined performance of hydrocarbon-adsorbing and catalytic conversion emissions control systems components. In each embodiment, heat transferred from the exhaust gas raises the temperature of the system's catalytic conversion component before the cooled exhaust gas contacts the system's hydrocarbon-adsorbing component.

Removing heat from the exhaust gas prior to passing the gas through the system's hydrocarbon adsorber increases hydrocarbon hold-up time because the adsorber is more effective at lower temperatures. Furthermore, because the removed heat is used to warm the catalytic converter, the catalytic converter lights off sooner than it would if the exhaust gas heat was not transferred to it. These effects combine to substantially reduce hydrocarbon emissions during the time period immediately following a cold engine start.

In each case, and in contrast to systems such as those disclosed by Reid, the temperature differential between the hydrocarbon-adsorbing component and the catalytic conversion component is maximized by physically separating the adsorbing component from the converting component, thereby synergistically enhancing the performance of both components. In some embodiments, adsorbers effective under different emissions system operating conditions or temperature ranges are combined to provide improved adsorber performance to further minimize cold-start hydrocarbon emissions.

DETAILED DESCRIPTION OF THE INVENTION

Each of the emissions control systems discussed below uses heat transfer techniques in conjunction with a catalytic converter component and a hydrocarbon-adsorbing component to lower cold-start hydrocarbon emissions. While the adsorbents, catalysts and heat exchanger designs discussed below are exemplary of those useful in the invention, it will be apparent to those skilled in the art that other configurations employing different catalysts, heat exchange structures or hydrocarbon adsorbers can be constructed without departing from the scope of the invention.

Figures 1, 2, 3, 4:
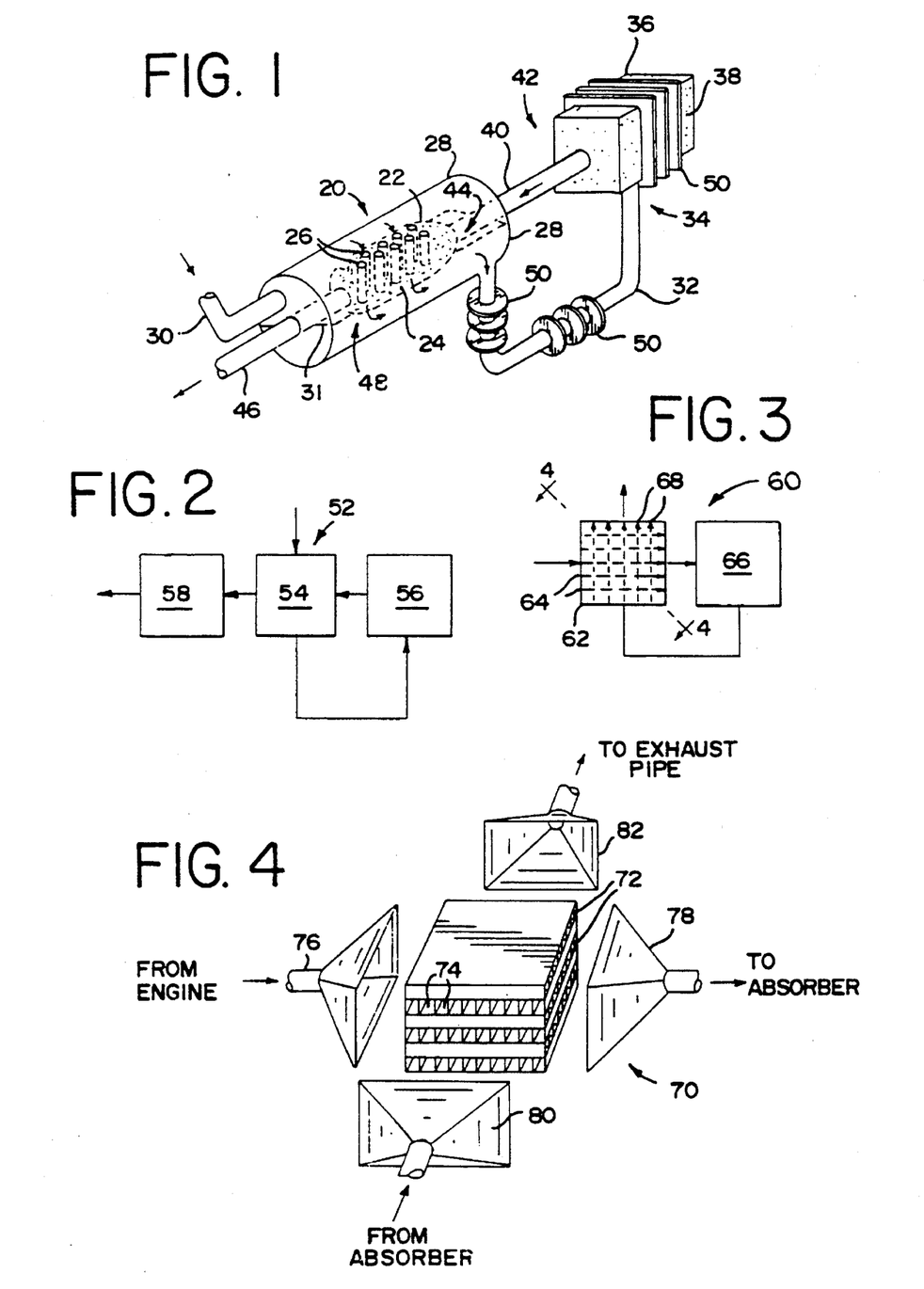
FIG. 1 is a perspective view of an emissions control system in accordance with the present invention.
FIGS. 2 and 3 are schematic views of other heat-exchanging emissions control systems.
FIG. 4 is a simplified exploded perspective view of a catalytically-active cross-flow heat exchanger particularly useful in the emissions control system shown in FIG. 3.

FIG. 1 is a simplified cross-sectional view of one embodiment of an emissions control system 20 in accordance with the present invention. System 20 includes a catalytic converter 22 filled with a conventional automotive exhaust gas catalyst 24. Catalyst 24 typically will be an inorganic oxide support impregnated with a combination of noble metals such as platinum, palladium and rhodium. Such a combination of noble metals is useful for catalytically oxidizing exhaust gas hydrocarbons and carbon monoxide and for reducing the amount of harmful oxides of nitrogen ($NO_x$) released to the environment. While catalyst 24 is illustrated in the common pellet form, the physical form of catalyst 24 is not critical.

Converter 22 preferably includes a plurality of open-ended heat exchange ducts 26 running through converter 22 between and in contact with catalysts 24. A converter jacket 28 surrounds converter 22 and includes an exhaust gas inlet tube 30 for admitting engine exhaust into jacket 28 and a jacket internal baffle 31 for preventing entering exhaust gas from passing around rather than through ducts 26.

An exhaust gas outlet tube 32 is connected between jacket 28 and an inlet end 34 of an adsorber chamber 36 filled with a hydrocarbon adsorbent 38 as discussed herein. An exhaust gas recirculation pipe 40 connects an outlet end 42 of adsorber chamber 36 to an inlet end 44 of catalytic converter 22. An exhaust gas discharge pipe 46 provides an outlet for gases discharged from a discharge end 48 of catalytic converter 22.

During operation, exhaust gas enters jacket 28 through inlet tube 30, loses heat to converter 22, and exits jacket 28 through outlet tube 32. The heat given up by the exhaust gas helps to bring converter 22 to its light-off temperature and causes exhaust gas exiting outlet tube 32 to be at a lower temperature than would be the case in the absence of the heat transfer to converter 22. Cooled exhaust gas from outlet tube 32 enters adsorbent 38, causing uncombusted hydrocarbons to remain trapped on adsorbent 38 until adsorbent 38's temperature rises to a temperature sufficient to desorb the hydrocarbons from adsorbent 38. Until the desorption temperature is reached, uncombusted hydrocarbons are collected and remain trapped within chamber 36 while the hydrocarbon-depleted exhaust gas is discharged through pipe 40, converter 22 and pipe 46.

After the desorption temperature has been reached, hydrocarbons are desorbed from adsorbent 38 and are catalytically oxidized in converter 22 if converter 22 has reached its light-off temperature. Because exhaust gas is cooled prior to entering chamber 36, adsorbent 38 requires a longer time to reach its desorption temperature. If desired, exhaust gas entering outlet pipe 32 and adsorbent 38 can be cooled further by providing heat-sink structure such as optional fins 50 on the outer surfaces of pipe 32 and/or chamber 38. Furthermore, because the heat removed from the exhaust gas heats converter 22, converter 22 reaches its light-off temperature quickly. The foregoing effects combine to significantly reduce hydrocarbon emissions during the cold-start period. Finally, because chamber 36 is physically separate from converter 22, the temperature differential between converter 22 and adsorbent 38 is maximized, further enhancing the effectiveness of system 20.

FIG. 2 schematically illustrates another embodiment of an emissions system 52 in accordance with the present invention. In system 52, exhaust gas passes through tube bundles (not visible) in stand alone air-to-air heat exchanger 54 prior to flowing into an adsorber 56. Heat given up from the exhaust gas to heat exchanger 54 reheats previously cooled gas exiting adsorber 56 which passes over the tube bundles in heat exchanger 54 on its way to catalytic converter 58. The physical separation of heat exchanger 54, adsorber 56 and converter 58 help to maintain adsorber 56 below its desorption temperature while causing converter 58 to heat up and light-off at the earliest possible time.

The embodiment shown in FIG. 2 can reduce exhaust gas temperatures by up to about 200 degrees Centigrade under typical exhaust gas conditions. To obtain this result, heat exchanger 54 should have a tube area of about 9 square feet. It is preferred that exchanger 54 be constructed from a corrosion resistant material such as 316 grade stainless steel. Other heat exchange devices such as plate-type exchangers also are suitable for use as exchanger 54. Useful data for constructing suitable heat exchangers can be found in standard engineering treatises such as the 5th Edition of Perry and Chilton's Chemical Engineer's Handbook which are known to those skilled in the art of heat exchanger design.

FIG. 3 schematically illustrates an emissions system 60 somewhat similar in design to that shown in FIG. 2. System 60 employs a catalytic converter 62 having an integral heat exchange structure incorporated therein. Exhaust gas flows through heat exchange channels 64 in converter 62, through an adsorber 66, and back through manifolded catalytically-active channels 68. The perpendicular flow of exhaust gas through channels 64 heats catalytically-active channels 68 and lowers the exhaust gas temperature before the exhaust gas reaches adsorber 66.

Figure 7:
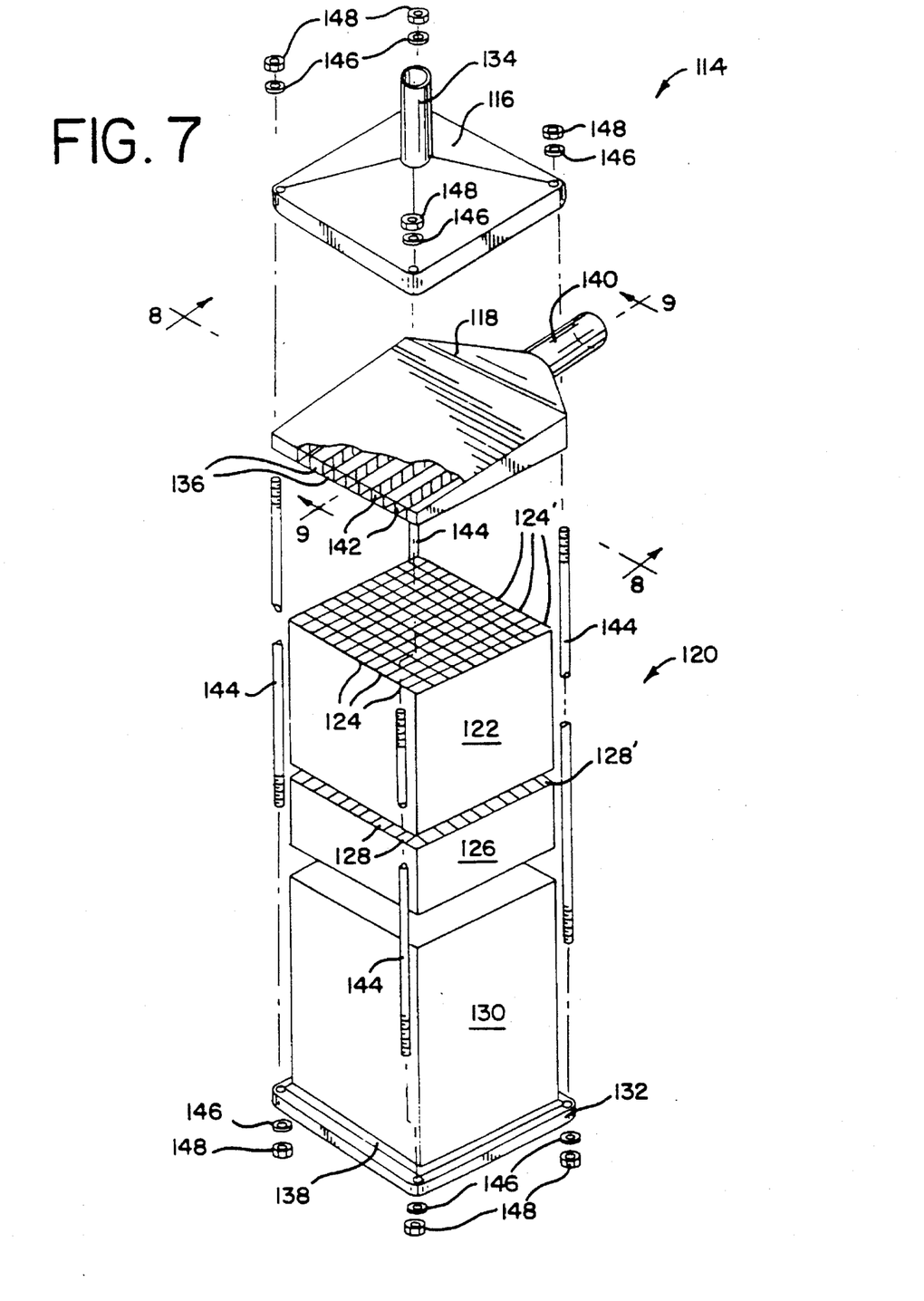
FIG. 7 is an exploded perspective view of an emissions control system employing a heat-exchanging hydrocarbon-adsorbing ceramic monolith.
Figure 8:
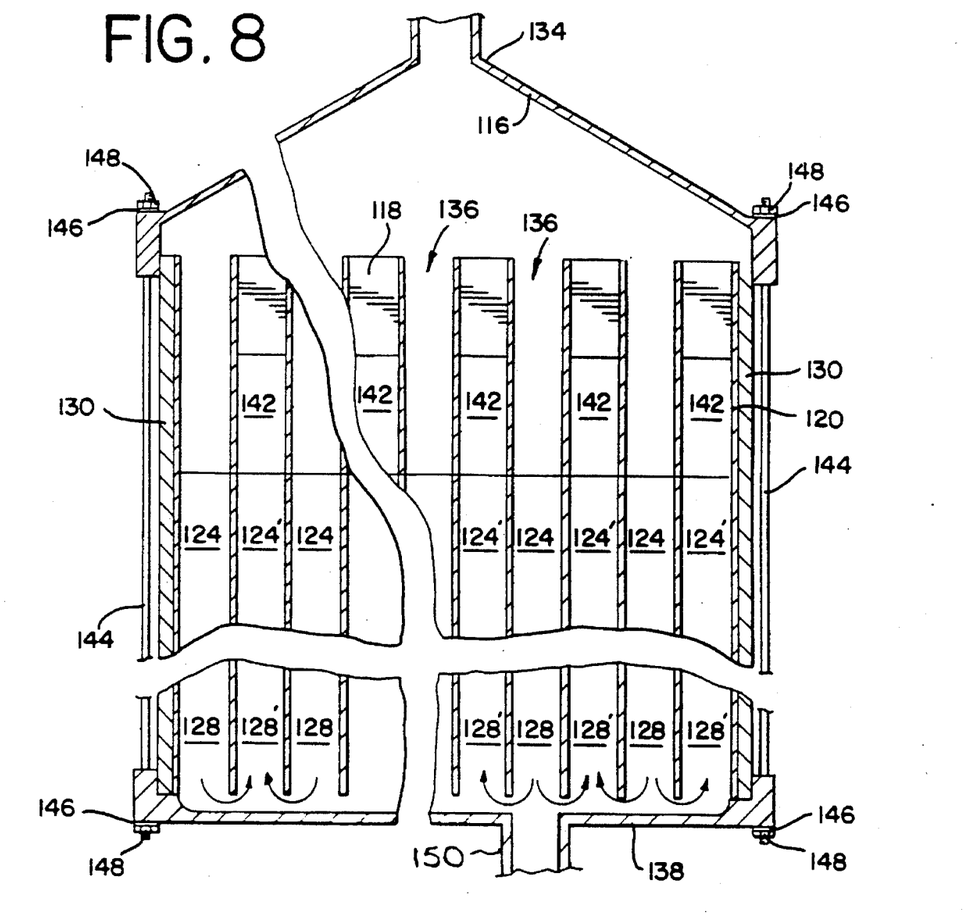
FIGS. 8 and 9 are partial sectional views of the emissions control system shown in FIG. 7 taken along lines 8—8 and 9—9, respectively.
Figure 9:
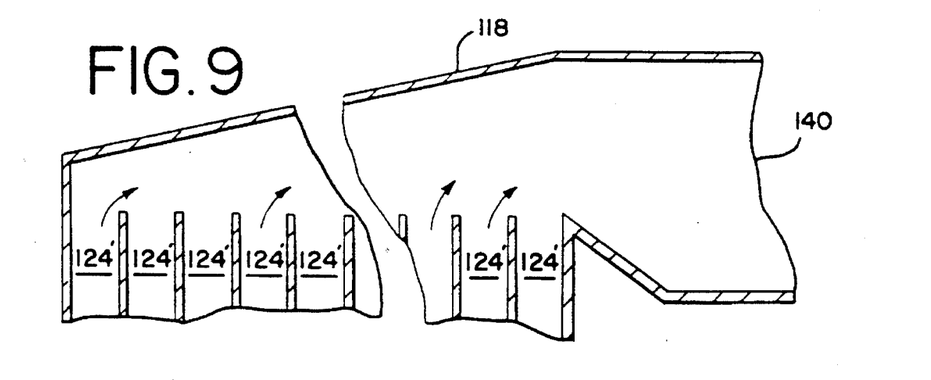

A suitable structure for catalytic converter 62 can be produced by using monolithic ceramic catalyst support technology similar to that discussed in conjunction with FIGS. 7-9. FIG. 4 illustrates a simple configuration of such a device. A manifolded monolithic catalytically-active heat exchanger 70 includes alternating, perpendicular rows of heat exchange ducts 72 and catalytically-active ducts 74. Exhaust gas enters one end of heat exchange ducts 72 through heat exchanger inlet manifold 76, exits the opposite end of ducts 72, is collected by heat exchanger outlet manifold 78 and passes on to adsorber 66 (see FIG. 3). Exhaust gas returning from adsorber 66 passes through a catalytic converter inlet manifold 80, through catalytically-active ducts 74, and is collected and exhausted from exchanger 70 through catalytic converter outlet manifold 82.

Exchanger 70 can be formed by cementing together alternating, perpendicular rows of catalytically-active and non-active extruded ceramic ducts as discussed below. Alternatively, similarly shaped metallic or ceramic-coated metallic structures may be produced and joined together by cementing or welding as appropriate. Catalytically-active rows 74 can be produced by washcoating catalyst onto the inner surface of each active duct. If desired, ducts 72 and 74 can run parallel, with the flows through channels 72 and 74 running countercurrent to one another. In this case, the cementing together of alternating rows of catalytically-active and non-active channels can be avoided by washcoating a single extruded structure having every other row of channels plugged at each end prior to the washcoating process. Additional constructional details for monolithic, catalytically-active heat exchangers are discussed below in conjunction with FIGS. 7-9. As used hereafter, the term "monolith" means a unitary structure having a plurality of generally symmetric ducts useful for carrying or containing catalyst or hydrocarbon-adsorbing materials.

Figure 5:
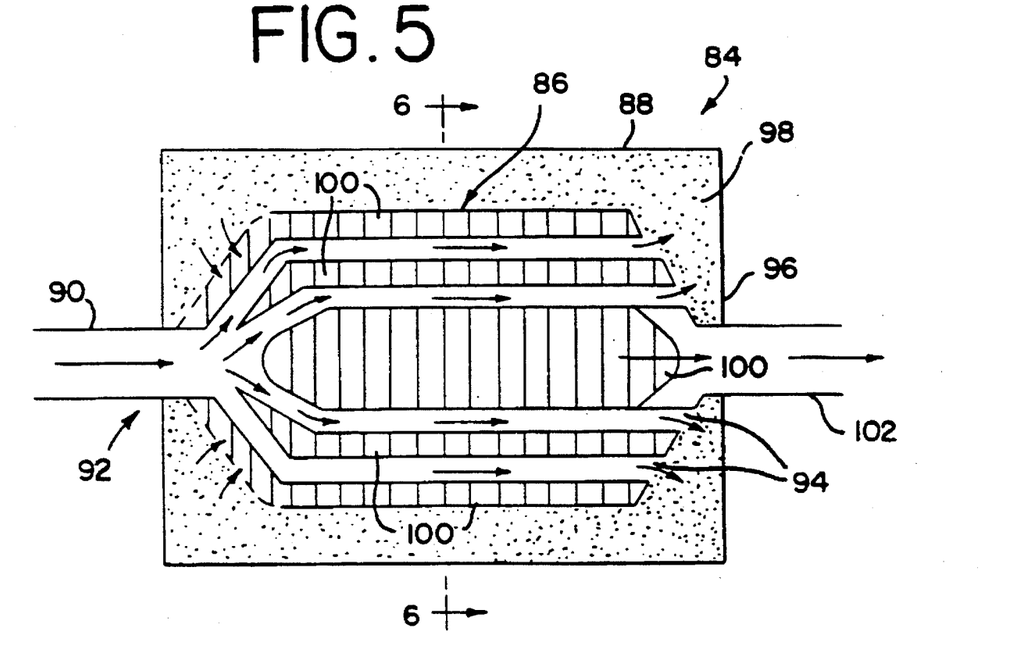
FIGS. 5 and 6 are sectional views of another emissions control system employing a cylindrical heat-exchanging catalytic converter located concentrically within a hydrocarbon adsorber.
Figure 6:
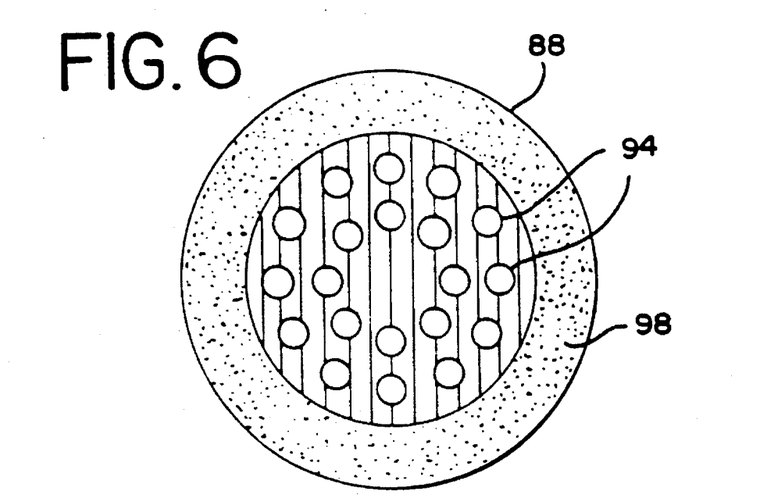

FIGS. 5 and 6 illustrate another emissions systems configuration useful for practicing the invention. Turning first to FIG. 5, an emissions control system 84 includes a catalytic converter 86 concentrically located within a system housing 88. Exhaust gas enters converter 86 through an inlet tube 90 at a front end 92 of housing 88, flows through a plurality of manifolded heat exchange ducts 94 within converter 88 and is discharged into a rear end 96 of housing 88. Exhaust gas then flows toward front end 92 of housing 88 through an adsorbent 98, reverses flow and flows through a catalytically-active region 100 of converter 86 and out an exhaust pipe 102.

FIG. 6 is a cross section of system 84 taken along line 6—6 of FIG. 5. As can be seen be comparing FIGS. 5 and 6, manifolded heat exchange ducts 94 run longitudinally through converter 86 within catalytically-active region 100. Gas passing through ducts 94 heats catalyst region 100, thereby lowering the exhaust gas temperature before the gas flows through adsorbent 98.

Catalysts and adsorbents suitable for use in the embodiments discussed in conjunction with FIGS. 1-6 generally include pelletized, extruded or supported forms well-known in the art, although these designs also are well-suited to the application of ceramic or metallic monolithic supports bearing washcoated or homogeneously-mixed catalyst or adsorber as discussed below. Tubing and metallic components should be constructed from a corrosion resistant metal and may include additional heat-sink structure such as disclosed in conjunction with FIG. 1 to further lower the temperature of exhaust gas entering the hydrocarbon-adsorbing portion of the system.

FIGS. 7-9 illustrate still another embodiment of the invention. FIG. 7 is an exploded perspective view of a monolithic catalytically-active heat exchanger emissions control system 114 which incorporates an adsorbent for reducing cold-start hydrocarbon emissions. Principal components of system 114 include an inlet manifold 116, an outlet manifold 118, a monolithic catalytically-active heat exchanger or monolith 120 comprising a first monolith portion 122 having a plurality of catalyst-coated heat exchange channels 124, a second monolith portion 126 having a plurality of adsorber-coated channels 128, a system housing 130 for enclosing monolith 120, and a bottom plate 132 for reversing exhaust gas flow as explained herein.

During operation of system 114, exhaust gas enters inlet manifold 116 through an exhaust gas inlet tube 134 and passes through a plurality of outlet manifold apertures 136 and into heat exchange channels 124. As will be discussed in detail in conjunction with FIGS. 8 and 9, apertures 136 allow the exhaust gas to enter every other row of channels 124. Gas passes through channels 124, losing heat to the channel walls, and passes through adsorber-coated channels 128 toward bottom plate 132. Plate 132 includes a surface 138 located away from the lower ends of channels 128. Surface 138 allows gas to escape from the alternate rows of channels 128 and enter the adjacent rows of channels 128'. The exhaust gas passes upwardly through channels 124' which are covered over at their upper ends by outlet manifold 118. Gas exiting the upper ends of channels 124' is collected by outlet manifold 118 and discharged through an outlet manifold discharge tube 140.

First monolithic portion 122 functions as a combination heat exchanger and catalytic converter in a manner similar to catalytically-active heat exchanger 70 shown in FIG. 4. During the cold-start period, catalytically-active channels 124 and 124' are heated as exhaust gas passes through them. As before, the heat lost to channels 124 and 124' causes catalyst contained within these channels to reach its light-off temperature rapidly and lowers the temperature of the exhaust gas before the gas reaches adsorber-coated channels 128 and 128' in second monolith portion 126. As system 114 heats up, hydrocarbons initially adsorbed onto channels 128 and 128' are desorbed from these channels and pass through catalytically-active channels 124'. Preferably, both channels 124 and 124' contain catalyst, thereby maximizing the amount of catalytic surface area available for a given volume of monolith.

Because monolith 120 includes physically separated catalytically-active and hydrocarbon-adsorbing zones, a useful temperature differential between catalyst and adsorbent is more easily attained than in a converter having alternating catalytically-active and hydrocarbon-adsorbing regions.

Additional mechanical details of outlet manifold 118 and bottom plate 132 are best explained in conjunction with FIGS. 8 and 9. Referring first to FIG. 8, exhaust gas entering inlet manifold 116 enters alternate channels of first monolith portion 122 by passing through apertures 136 in outlet manifold 118. The exhaust gas then passes downwardly first through channels 124 and then through adsorber-coated channels 128 in second monolith portion 126. As the exhaust gas exits the lower ends of channels 128, the gas strikes plate 132 and then travels upwardly first through channels 128' and then through channels 124'. As gas exits the upper ends of channels 124', it enters a plurality of open-bottomed horizontally directed channels 142 which route exhaust gas into outlet manifold discharge tube 140 (see FIGS. 7 and 9). As can be seen in FIG. 8, the closed tops of channels 142 provide the structure that blocks gas flow from inlet manifold 116 into channels 124'.

Turning now to FIG. 9, upwardly moving gas exiting channels 124' is collected in open-bottomed duct 142 and directed out discharge tube 140. It is preferred that the cross sectional area of duct 142 increase toward discharge tube 140 to provide for a fairly constant gas velocity as the cumulative volume of gas discharged from channels 124' increases in that direction.

The number and relative size of the monolith channels illustrated in FIGS. 7–9 has been simplified to explain the operation of the invention. An operative number of channels for system 114 is about 60 by 60 channels with a channel density of about 100 channels per square inch. Channel wall thickness should be about 0.017 inches while the distance between channel walls should be about 0.083 inches. The length of monolith portions 122 and 126 can be about 8 and 4 inches, respectively, with the catalyst and adsorber loadings discussed below.

The width of outlet channel apertures 136 generally should correspond to the width of channels 124 but can be narrowed to provide a 0.05 thick aperture wall. The thicker wall lends mechanical strength to manifold 118 and makes aligning manifold 118 with monolith 120 less critical. The width of horizontal ducts 142 can also be about 0.05 inches and should taper upwards to a height of about 0.25 inches where ducts 142 empty into discharge tube 140.

Metallic components of system 114 such as manifolds 116 and 118, housing 130 and bottom plate 132 preferably are constructed from a corrosion resistant material such as 316 stainless steel. Tubing such as exhaust gas inlet tube 134 and that forming a part of outlet manifold discharge tube 140 should be formed from welded stainless steel tubing. Welds used to fabricate components such as discharge tube 140 should be as small as possible to minimize the effects of warping.

System 114 is assembled by first fastening monolith 120 within housing 130 to form a single unit. Outlet manifold 118 is then carefully placed over the exposed upper end of monolith 120 so that apertures 136 are in registry with channels 124. If desired, alignment grooves may be cut in or alignment stops fastened to the underside of manifold 118 to ensure that manifold 118 remains in registry with channels 124 during assembly. Sighting ports in inlet manifold 116 are also useful for this purpose.

Bottom plate 132 and inlet manifold 118 are attached over opposite ends of the monolithic unit and manifold 118 by screws 144, spring washers 146 and nuts 148 as shown in FIGS. 7 and 8. Screws 144, washers 146 and nuts 148 preferably are formed from a corrosion resistant stainless steel. Spring washers 146 should provide for about 0.05 inches of thermal expansion at each end of screws 144 to prevent damage to monolith 120 that would otherwise be caused by thermal expansion of monolith 120 under operating conditions. Mechanical devices other than springs that provide for the appropriate degree of thermal expansion can also be used.

Hydrocarbon adsorbents suitable for depositing on monolith 120 as well as in other embodiments of the invention include Union Carbide ultrastable Y sieves such as LZY-72 and LZY-82 and siliceous adsorbents such as silicalite. Most adsorbers containing microporous structures less than about 20 Angstroms in diameter such as natural and synthetic zeolites are also suitable. While activated carbon is an excellent adsorber, its use in this application is not preferred as it can be damaged by sustained exposure to high temperature exhaust gas. For this reason, activated carbon should not be used except where the exhaust gas constituents will not oxidize the carbon significantly and where adsorber operating temperature is sufficiently low to ensure continued operability of a carbon adsorber.

A hydrocarbon-adsorbing material useful in system 114 is a mixed zeolytic adsorber deposited on an extruded cordierite monolith at a concentration of about 40 weight percent of the support weight. This type of adsorber can be commercially prepared in accordance with the U.S. Patents incorporated by reference herein. Alternatively, a similarly-sized adsorber module could be used in place of the cordierite monolith. In this case, an equivalent amount of adsorber in the form of extrudates or monolithic elements can be packed in the module. In this packed embodiment, exhaust gas flows through the packed adsorber while reversing direction toward ducts 124'.

The effectiveness of adsorbents used in system 114, as well as in systems like those previously described, can be enhanced by combining two or more adsorbers which are effective in different temperature ranges or for different exhaust gas mixtures. The suitability of various adsorbents for combination can be determined in the following manner.

EXAMPLE

An adsorbent test reactor was constructed from a 2 inch length of ⅜ inch inner diameter glass tubing. The frontal cross section of a 220 square centimeter ceramic monolith such as those discussed in conjunction with FIGS. 7–9 was ratioed to the 0.7 square centimeter cross sectional area of the test reactor to determine that a test flow of about 3 liters per minute could be used to simulate the typical 25 cubic foot per minute flow from an automobile exhaust. The typical 3 gram per minute hydrocarbon emission rate of an average engine was correspondingly scaled to determine that the simulated hydrocarbon emission rate should be about 0.01 grams per minute.

Approximately two grams of adsorbent were placed in the test reactor. In the cases of the LZY-72 and -82 adsorbents, the adsorbents were formed onto monolithic ceramic test pieces by the Corning Co. of Corning, N.Y.. The USY sieve catalyst tested was a highly dealuminated USY sieve extrudate made from Grade 760 adsorbent obtained from the Conteka Co. and which included a 20 percent alumina binder. Adsorbent grade silicalite was obtained from the Union Carbide Co. and tested both as a 42% silicalite washcoat on a cordiedte monolith and as an extrudate. Activated carbon in a granular form was obtained from the Cenco Co.

A water-saturated nitrogen flow of about 3 liters per minute was established through the test reactor. Adsorbent performance was then tested by injecting a toluene adsorbate at a constant partial pressure and measuring the percent toluene breakthrough at the bed outlet with a flame ionization detector. Relative adsorber performance was evaluated by comparing the times for 25, 50 and 100 percent toluene breakthrough at 25 degrees Centigrade. These experiments were repeated at 100, 150, 200 and 250 degrees Centigrade. The results of the experiments are summarized in Table 1.

TABLE I

| Adsorbent | Form | Temperature °C. | Time Required to Reach % Breakthrough (mins.) | | |
|---|---|---|---|---|---|
| | | | '25 | '50 | '100 |
| LZY-72 | Monolith | 25 | 1.0 | 1.4 | 1.6 |
| LZY-82 | Monolith[1] | 25 | 0.3 | 0.8 | 1.5 |
| LZY-82 | Monolith[2] | 25 | 0.3 | 0.8 | 1.3 |
| USY Sieve | Extrudate | 25 | 5.2 | 10.5 | 17.5 |
| Silicalite | Extrudate | 25 | 2.7 | 5.5 | 11.4 |
| Silicalite | Monolith | 25 | 0.2 | 0.7 | 2.7 |
| Carbon | Granules | 25 | >60 | >60 | >60 |
| LZY-72 | Monolith | 100 | 13.0 | 17.7 | 26.0 |
| LZY-82 | Monolith[1] | 100 | 9.2 | 14.0 | 19.8 |
| LZY-82 | Monolith[2] | 100 | 10.1 | 18.9 | 27.4 |
| USY Sieve | Extrudate | 100 | 1.2 | 3.5 | 7.5 |
| Silicalite | Extrudate | 100 | 1.1 | 2.5 | 6.5 |
| Silicalite | Monolith | 100 | 0.8 | 2.8 | 4.3 |
| Carbon | Granules | 100 | 39.9 | 48.5 | 55.6 |
| LZY-72 | Monolith | 150 | 7.0 | 10.7 | 15.7 |
| LZY-82 | Monolith[1] | 150 | 0.8 | 3.8 | 7.7 |
| LZY-82 | Monolith[2] | 150 | 0.5 | 5.0 | 8.8 |
| USY Sieve | Extrudate | 150 | 0.5 | 1.0 | 2.0 |
| Silicalite | Extrudate | 150 | 0.8 | 1.6 | 3.2 |
| Silicalite | Monolith | 150 | 0.2 | 0.5 | 0.8 |
| Carbon | Granules | 150 | 18.7 | 24.4 | 30.0 |
| LZY-72 | Monolith | 200 | 2.2 | 4.6 | 8.0 |
| LZY-82 | Monolith[1] | 200 | 0.2 | 0.3 | 0.5 |
| LZY-82 | Monolith[2] | 200 | 0.3 | 0.4 | 0.6 |
| USY Sieve | Extrudate | 200 | 0.1 | 0.5 | 2.0 |
| Silicalite | Extrudate | 200 | 1.0 | 1.8 | 4.1 |
| Silicalite | Monolith | 200 | 0.5 | 0.7 | 2.1 |
| Carbon | Granules | 200 | 5.6 | 9.8 | 15.1 |
| LZY-72 | Monolith | 250 | 0.5 | 0.8 | 1.3 |
| Carbon | Granules | 250 | 2.1 | 4.2 | 7.8 |

[1](9% silica binder)
[2](25% alumina binder)

The 25% breakthrough times summarized in Table 1 show that LZY-72, a hydrophilic adsorber, provides superior toluene adsorption at temperatures of about 150° C. and greater.

On the other hand, hydrophobic absorbers such as silicalite and dealuminated USY sieve outperformed LZY-72 at 25 degrees Centigrade and offered comparable performance up to at least 100 degrees Centigrade.

The results suggest that an improved hydrocarbon adsorber can be produced by mixing two adsorbers effective at different temperatures. For this reason, it is believed that a dual component adsorbent comprising part LZY-72 and part silicalite or dealuminated USY sieve adsorbent will offer improved hydrocarbon hold-up in emissions control systems. It is also believed that the use of a mixture of hydrophobic and hydrophilic adsorbents may provide superior adsorber performance over the range of conditions encountered between cold-start and catalyst light-off because the hydrophobic adsorbers are not effected by the relatively high concentrations of water vapor present in the low temperature gas exhausted immediately after engine start-up. As used hereafter, an "effective" adsorber is defined as an adsorber having a 25% breakthrough time of greater than one minute at a given temperature under the experimental conditions disclosed above.

It also should be noted that if granularized carbon is selected for use as an adsorbent, it may be in either a hydrophilic and hydrophobic form. Hydrophobic forms of carbon can be prepared by heat treating hydrophilic forms of carbon to remove the hydrophilic groups on and near the surface of the carbon granules.

A catalytically-active structure useful in monolith 120 is a cordierite monolithic support structure washcoated with up to about 40 weight percent of an exhaust gas catalyst of the type previously discussed. Such a structure can be purchased or prepared by procedures like those taught in the U.S. Patents incorporated by reference herein.

Monolithic support structures suitable for use in exhaust gas treatment systems are well known in the art. Ceramic batch materials useful for forming ceramic monolithic catalyst and adsorbent supports include cordierite, mullite, alumina, lithium aluminosilicates, zirconia, feldspars, quartz, fused silica, kaolin clay, aluminum titanate, silicates, spinels and mixtures thereof. The desired shape of the monolithic support can be obtained by extruding the ceramic batch material through an extrusion die to form honeycombed, square or other geometry channels. The extruded batch material should be sintered by firing the material to a temperature typically between about 800 and 1500 degrees Centigrade.

Metallic monolithic supports may also be used in the invention. For example, a monolith having a plurality of ducts may be formed by rolling a fan-folded sheet around itself and welding the sheet of metal as required to retain the desired shape. Metals and welding points should be chosen to minimize the effects of thermal expansion.

Catalysts and adsorbents may be deposited on or in monolithic supports by wash-coating a previously-prepared support or by mixing the catalyst or adsorbent into the ceramic batch material prior to extrusion if the catalyst or adsorbent can survive the extrusion and sintering processes. Techniques useful for producing catalytically-active or adsorber-containing ceramic materials can be found in U.S. Pat. Nos. 4,888,317 and 4,657,880. Techniques for producing monolithic ceramic support media can be found in U.S. Pat. Nos. 5,039,644, 4,877,766, 4,631,268, 4,631,269, 4,637,995, 3,885,976 and 3,790,653. Techniques for washcoating monolithic supports are well known in the art and examples can be found in U.S. Pat. No. 4,532,228. The foregoing U.S. Patents are each hereby incorporated by reference.

Monolith 120 can be produced by dipping first portion 122 into a catalyst solution to a depth equal to the length of first portion 122. Portion 126 can be similarly prepared by turning the support structure upside down and dipping it into an adsorbent washcoat solution to a depth equal to the length of second portion 126. If certain channels are desired to remain free of catalyst or adsorbent, these channels should be plugged prior to dipping the monolith into the washcoat solution. While it is preferred that monolith 120 be prepared from a single extruded support, portions 122 and 126 may be prepared as separate monoliths and cemented together if ceramic or welded or otherwise joined if the support is metallic.

The use of heat exchanging components such as those discussed above also enables the use of alternative gas treatment regimes in which the different components of a multifunction catalyst can be preferentially distributed throughout different regions of the system. For example, an embodiment similar to the one shown in FIGS. 7–9 could be operated with a $NO_x$-reducing catalyst such as those that contain rhodium, ruthenium or similar metals in channels 124 ahead of adsorber portion 126 and a platinum or standard three-way catalyst in channels 124' after adsorber portion 126. In this case, the engine could be operated with a rich air/fuel mixture which will provide a reductive environment in the channels 124 which will enhance $NO_x$ reduction. Supplemental oxygen should be provided (conduit 150 in FIG. 8) after the hydrocarbon-adsorbing portion of the system to ensure effective catalytic conversion of hydrocarbons and carbon monoxide. This also facilitates the use of hydrocarbon adsorbers which might otherwise be damaged or rendered ineffective by continued exposure to oxygen.

It should be noted that the improved adsorber performance derived from the use of heat exchange techniques and improved adsorbent combinations in accordance with the present invention may require adjustment of other emissions control equipment. Such a change is likely to be required because the improved hydrocarbon adsorber performance delays the time at which the initial burst of adsorbed hydrocarbons is released to the catalytic converter. This in turn may require changes such as providing extra combustion air during the time the desorbed hydrocarbons reach the catalytically-active portion of the emissions system.

The emissions control systems just described are representative of the many variations and modifications of the invention which will be apparent to those skilled in the emissions systems art after studying the examples disclosed herein. Therefore, the invention is not intended to be limited by these examples. For example, the use of other adsorbers, catalysts and heat exchanger configurations is contemplated, and the scope of the invention is intended to be limited only by the following claims.

We claim:

1. A catalytically-active heat exchanger emissions control system for treating exhaust gas containing hydrocarbons, carbon monoxide, nitrogen oxide from an internal combustion engine, which comprises:

a catalytically-active heat exchanger including a plurality of first heat exchange channels defining a first catalytically-active zone which contains a first catalyst and is suitable for receiving an exhaust gas containing hydrocarbons, carbon monoxide, nitrogen oxide from an internal combustion engine, and including a plurality of second heat exchange channels defining a second catalytically-active zone which contains a second catalyst having a minimum effective operating temperature for catalyzing the oxidation of hydrocarbons and is disposed in flow communication with and downstream of the first heat exchange channels, the heat exchanger being arranged to transfer heat from the first channels to the second channels in a manner which promotes heating of the second catalyst to the minimum operating temperature during the time period from after a cold-start of the engine to before the second catalyst is heated to the minimum effective operating temperature; and an adsorbent channel defining a hydrocarbon-adsorbing zone disposed in flow communication with and downstream of the first catalytically-active zone, and disposed in flow communication with and upstream of the second catalytically-active zone.

2. The catalytically-active heat exchanger emissions control system of claim 1 wherein the first catalyst is suitable for reducing nitrogen oxide present in the exhaust gas and the second catalyst is suitable for oxidizing hydrocarbons present in the exhaust gas.

3. The catalytically-active heat exchanger emissions control system of claim 2 wherein the first catalyst is substantially composed of rhodium or ruthenium.

4. The catalytically-active heat exchanger emissions control system of claim 1 wherein the first catalyst is suitable for oxidizing carbon monoxide present in the exhaust gas and the second catalyst is suitable for oxidizing hydrocarbons present in the exhaust gas.

5. The catalytically-active heat exchanger emissions control system of claim 1 wherein the catalytically-active heat exchanger is arranged for cross-flow operation, the first channels alternate with and are disposed perpendicularly relative to the second channels.

6. The catalytically-active heat exchanger emissions control system of claim 1 wherein the first channels are located parallely adjacent to the second channels.

7. A method for reducing cold-start hydrocarbon emissions from an internal combustion engine comprising the steps of:

passing exhaust gas from an internal combustion engine through a first flow path of a catalytically-active heat exchanger including a plurality of first heat exchange channels which define the first flow path and contain a first catalyst for reacting at least one of hydrocarbons, carbon monoxide, and nitrogen oxide present in the exhaust gas, the catalytically-active heat exchanger also including a plurality of second heat exchange channels which define a second flow path and contain a second catalyst having a minimum effective operating temperature for catalyzing the oxidation of hydrocarbons;

transferring heat removed from the exhaust gas in the first channels of the heat exchanger to heat the second channels in a manner which promotes heating of the second catalyst to the minimum operating temperature during the time period from after a cold-start of the engine to before the second catalyst is heated to the minimum effective operating temperature;

passing the exhaust gas from the first channels into an adsorbent channel containing an adsorbent to adsorb hydrocarbons from the exhaust gas; and passing the exhaust gas from the absorbent through the second flow path.

8. The method of claim 7 wherein the first catalyst catalyzes the oxidation of carbon monoxide present in the exhaust gas and the second catalyst catalyzes the oxidation of hydrocarbons present in the exhaust gas.

9. The method of claim 7 wherein the first catalyst catalyzes the reduction of nitrogen oxide present in the exhaust gas and the second catalyst catalyzes the oxidation of hydrocarbons present in the exhaust gas.

10. The method of claim 9 wherein the internal combustion engine is operated with a fuel to air mixture which provides a reductive environment in the first channels.

11. The method of claim 7 which further comprises heating the adsorbent to desorb hydrocarbons from the adsorbent and passing the desorbed hydrocarbons into the second flow path.

12. The method of claim 7 wherein the catalytically-active heat exchanger is arranged for cross-flow operation, the first channels alternate with and are disposed perpendicularly relative to the second channels.

13. The method of claim 7 wherein the catalytically-active heat exchanger is arranged for cocurrent flow operation or countercurrent flow operation, the first channels are located parallely adjacent to the second channels.

* * * * *

UNITED STATES PATENT AND TRADEMARK OFFICE
CERTIFICATE OF CORRECTION

PATENT NO. : 5,609,832

DATED : March 11, 1997

INVENTOR(S) : Rodney L. Mieville, et al.

It is certified that error appears in the above-indentified patent and that said Letters Patent is hereby corrected as shown below:

| Col. | Line | |
|---|---|---|
| 6 | 19-20 | "As can be seen be comparing FIGS. 5 and 6," should read --As can be seen by comparing FIGS. 5 and 6,-- |
| 9 | 17 | "cordiedte monolith" should read --cordierite monolith-- |
| 10 | 38 | "spineIs" should read --spinels-- |
| 11 | 57 | "carbon monoxide, nitrogen oxide" should read --carbon monoxide, or nitrogen oxide-- |
| 11 | 63 | "carbon monoxide, nitrogen oxide" should read --carbon monoxide, or nitrogen oxide-- |

Signed and Sealed this

Twenty-sixth Day of August, 1997

Attest:

BRUCE LEHMAN

Attesting Officer

Commissioner of Patents and Trademarks